Feb. 14, 1939. S. J. NORDSTROM 2,146,910
VALVE
Original Filed July 25, 1933 3 Sheets-Sheet 2

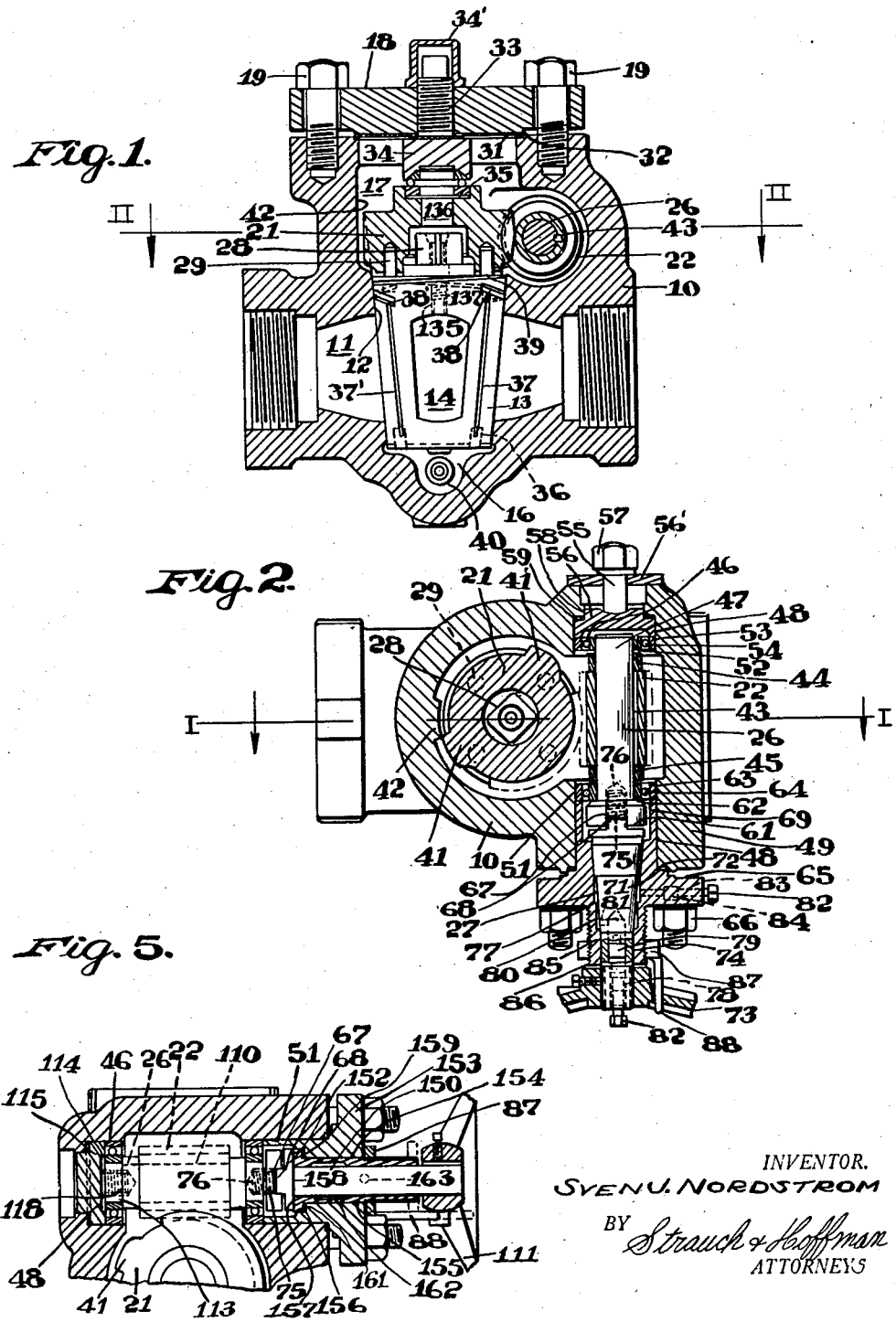

INVENTOR.
SVEN J. NORDSTROM
BY Strauch & Hoffman
ATTORNEYS

Feb. 14, 1939. S. J. NORDSTROM 2,146,910
VALVE
Original Filed July 25, 1933 3 Sheets-Sheet 3
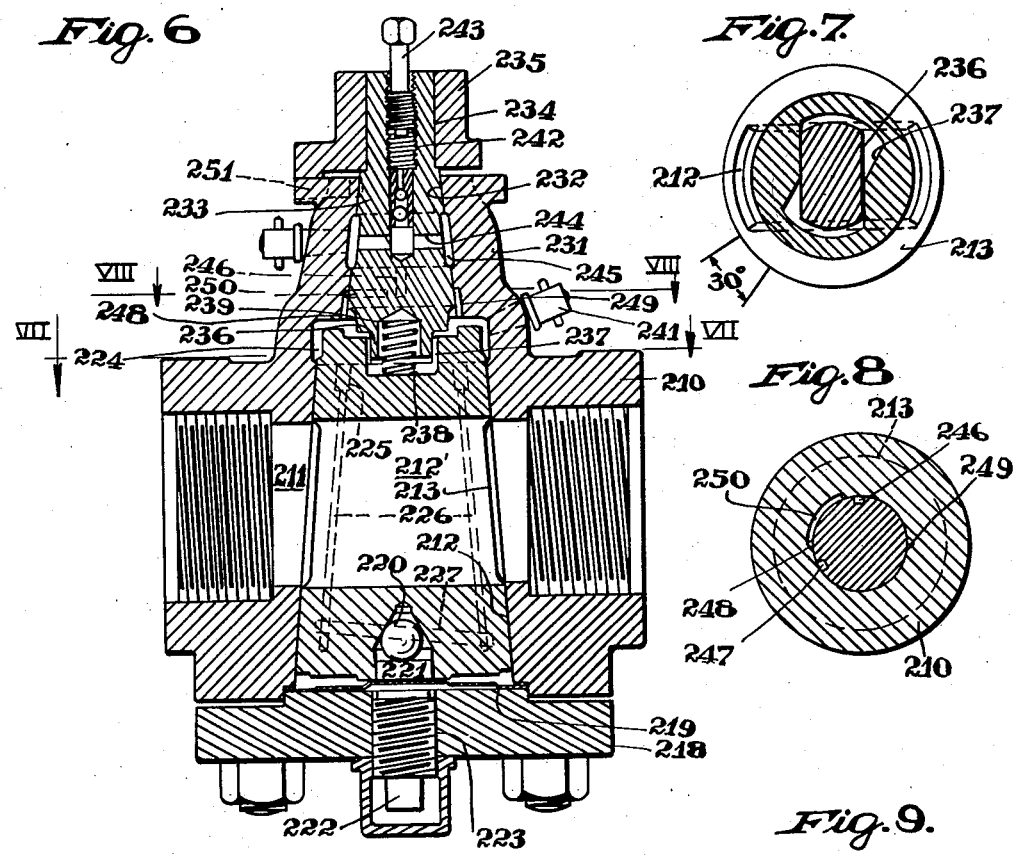
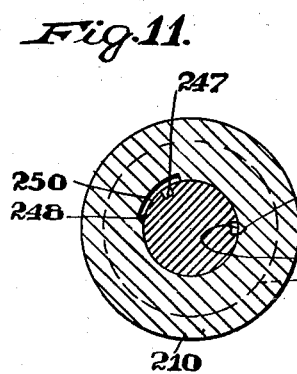
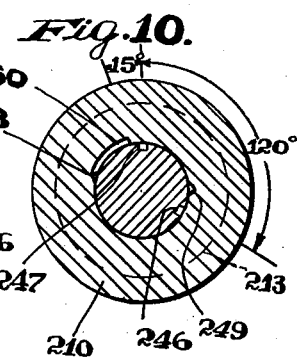
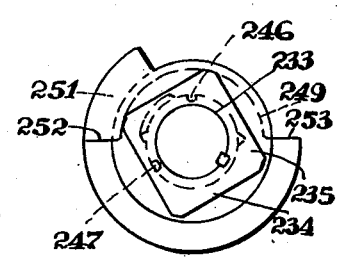
INVENTOR.
SVEN J. NORDSTROM
BY Strauch & Hoffman
ATTORNEYS Patented Feb. 14, 1939

2,146,910

UNITED STATES PATENT OFFICE 2,146,910

VALVE

Sven J. Nordstrom, Piedmont, Calif., assignor to Merco Nordstrom Valve Company, Pittsburgh, Pa., a corporation of Delaware Continuation of application Serial No. 682,136, July 25, 1933. This application May 25, 1936, Serial No. 81,751

21 Claims. (Cl. 251—93)

The present invention relates to improvements in valve structures and particularly to preventing leakage of line fluid out along the operating stem of the valve. The invention is especially applicable to plug valves, and as embodied in valves of this type, it further relates to preventing leakage of line fluid past the plug. This application is a continuation of my copending application filed July 25, 1933, Serial No. 682,136 for Plug valve.

In valves in common use the seal between the operating stem or spindle of the valve and the valve body or casing is effected by fibrous or similar packing. The use of this type of packing around the stem increases the resistance to turning and requires frequent adjustment and renewal of the packing to maintain a fluid tight joint. It has heretofore been proposed to eliminate the use of fibrous packing material around the stem by providing the stem with a tapered surface which seats against a similar tapered surface on the casing. However, such prior devices have not been successful because the tapered surfaces become wedged or locked in position making them difficult to turn, and when the surfaces become scored in the operation of the valve due to entrance of abrasive foreign material, the joint develops a leak which cannot be stopped. In the prior pressure lubricated type of plug valves in most common use wherein lubricant pressure is utilized to unseat the plug for rotation, the plug is resiliently urged into its seat by the fibrous or similar packing which also serves the purpose of sealing the stem. Thus, each time the packing is adjusted to prevent leakage past the stem, the resilient pressure exerted on the plug for seating the stem likewise is varied, and when the packing is adjusted to exert the proper pressure on the plug for seating the stem, the packing around the stem may be too loose to prevent leakage, or too tight to allow free turning. Thus, it is difficult to control the compression of the packing within the accurate limits required for the best service.

The invention obviates the necessity of using fibrous or like packing material and at the same time provides an effective seal having advantages over known types. In accordance with the present invention, I provide a valve stem having a laterally extending portion such as a flange or tapered part, coacting with a correspondingly shaped sealing surface, and lubricant under pressure is introduced therebetween to lubricate the stem, prevent leakage, and decrease resistance to turning. The invention is particularly applicable to plug valves in which the plug is jacked from its seat to permit easy turning, and as so applied, I preferably provide separate adjustable resilient means to urge the plug into its seat to provide the required seating pressure on the plug that is independent of the stem sealing means. The stem may be separate from the plug, or in certain instances may be integral therewith. The plug is maintained on its seat by a resilient metal cover forming an outer wall of the casing, the cover having the necessary elasticity and strength required to seat the valve against line pressure, and against the lubricant pressure developed in unseating or jacking the plug, the pressure of the cover against the plug being made adjustable in any suitable manner.

In the preferred embodiment, and especially in the larger sizes of valves, I provide novel power multiplying means, the working parts of which are housed in the valve body and are thus protected and may be lubricated, together with an external indicator to show the position of the valve.

In the preferred specific embodiment of my invention I provide a plug valve in which the stem has a tapered or conical portion cooperating with a similarly tapered sealing surface associated with the casing, lubricant being introduced under pressure between the tapered surfaces to provide a seal therebetween. Means also are provided to enable lubrication of the stem sealing means independently of or concurrently with the jacking and lubrication of the valve plug. I may also provide an arrangement of lubricant ducts in the tapered surfaces so that the lubricant grooves on the valve plug may be disconnected from the source of lubricant pressure in certain positions of the plug.

Accordingly, it is an object of the present invention to provide a valve having an operating stem with a sealing surface thereon cooperating with a sealing surface associated with the casing, and having means for introducing viscous lubricant under pressure between the sealing surfaces to lubricate the same and prevent leakage therebetween to the exterior.

Another object of the invention is the provision of a plug valve having an operating stem with a tapered sealing surface thereon cooperating with a tapered sealing surface on the casing, lubricant under pressure being introduced therebetween for lubrication and to prevent leakage.

Another object of the invention is the provision of a valve having an operating stem with a sealing surface thereon cooperating with a sealing surface associated with the casing, and having means for urging the sealing surfaces together by application of lubricant under pressure.

Another object of the invention is the provision of a plug valve in which fibrous and similar packing materials are eliminated and which is substantially free from leakage and is easy to operate.

A further object of the invention is the provision of a plug valve in which the lubricating system for the plug may be disconnected from the source of lubricant pressure in certain positions thereof, so that a check valve need not be employed to prevent refluxing of lubricant.

Still another object of the invention is the provision of a plug valve having a system of lubricant grooves in the seating surfaces of the plug and casing providing a substantially closed circuit lubricating system at each end of the port in the plug in closed position, and which may be disconnected from the source of lubricant pressure in going between open and closed positions.

Another object of the invention is the provision of a plug valve having a lubricant chamber for jacking the plug from its seat which may be disconnected from the source of lubricant pressure.

Still a further object of the invention is the provision in a lubricating valve of separate sealing means for the valve operating means, as distinct from the lubricant system for lubricating the valve plug and accomplishing the jacking thereof, wherein different lubricants of the most advantageous characteristics may be employed in connection with lubrication of the valve and of its operating means to more effectively insure against the possibility of leakage, particularly when subjected to relatively high pressure.

Still a further object of my invention is to provide novel power multiplying mechanism for valve structures, the working parts of which are housed in the valve body and may be lubricated, so that no fibrous packing means is required to prevent leakage of the fluid past the joint between the operating mechanisms and the valve body.

Still another object of my present invention is the provision of a plug valve having a plug and a separate tapered operating stem, a lost motion arrangement being provided between the plug and the operating stem, whereby the stem can be jacked off its seat and rotated slightly to spread a lubricant film thereover, and thereafter permit the plug to be jacked from its seat in the valve casing.

Still another object of my present invention is the provision of a novel plug valve, wherein the provision of a novel plug valve, wherein a plug and separate tapered operating means is provided therefor, jacking means being provided in connection with the valve, and operating to jack the tapered stem off its seat and turn it slightly to spread a lubricant film thereover, and thereafter operating to jack the plug from its seat and effect rotation thereof through operation of the tapered operating stem.

Still a further object of my invention is the provision of a plug valve having a plug in a valve casing and a separate tapered operating stem for said plug mounted in the casing, together with substantially closed circuit lubricant grooves surrounding the valve ports in open and closed position, and means associated therewith for jacking both the plug and the tapered operating stem from their respective seats.

A further object of my invention is the provision of a novel plug valve having a tapered operating stem separate from the valve plug and fitted into a tapered bearing, whereby leakage around the stem is prevented, and wherein the operating stem is associated with suitable jacking means whereby it may be jacked from its bearing or seat to permit easy turning thereof by a portion of the movement ordinarily required to operate the plug.

Among other objects of my invention is the provision of a compact valve in relatively large sizes having enclosed gearing which is easy to operate, simple in construction and is characterized by relatively few parts. These and other objects will be apparent from a consideration of the annexed drawings taken in connection with the description and in which:

Figure 1 is a section on line I—I of Figure 2 of a valve built according to one modification of the invention with the plug shown in elevation.

Figure 2 is a section on line II—II of Figure 1.

Figure 5 is a section of a modification.

Figure 6 is a vertical section of a modification showing a separate operating stem for operation with a wrench.

Figure 7 is a section taken on line VII—VII of Figure 6.

Figure 8 is a section taken on line VIII—VIII of Figure 6, with the valve in open position.

Figure 9 is an elevation in plan with the wrench adapter in place.

Figure 10 is a section on line VIII—VIII of Figure 6 when the valve is in closed position; and Figure 11 is a section on line VIII—VIII of Figure 6, the stem being in intermediate position.

Figure 3:
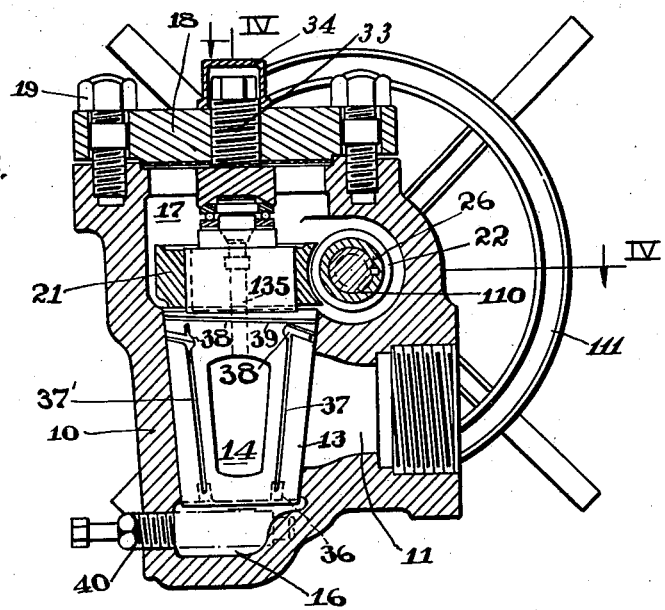
Figure 3 is a composite section on line III—III of Figure 4 of a further modification showing the plug in closed position.

Referring to the drawings Figure 1, the invention comprises a body or casing 10, provided with a passageway 11 for flow of line fluid. Also formed within the casing and extending transversely of the passageway 11, is a bore 12 which forms a tapered or conical seat. Disposed within seat 12 there is a conical plug 13, provided with a hole 14 therethrough adapted to register with passageway 11 in open position of the valve. A chamber 16 is provided at the bottom of the plug, and at the top is formed a chamber 17 defined between the casing walls and the cover plate 18 held in place at its margin by studs 19.

The plug 13 is adapted to be rotated in its seat to open or closed position by the segmental worm gear 21 seated on the plug 13 and cooperating worm 22 secured on shaft 26 and rotatable by an operating stem 27 extending externally of the casing. The plug 13 has formed at its top an upstanding square stub 28 about which is fitted the worm gear 21, and pins 29 fitted in cooperating holes in the worm gear and plug form a driving connection therebetween. A sealing diaphragm 31 is clamped between the cover 18 and a shoulder 32 at the top of casing 10. The plug is pressed into its seat by an adjustment screw 33 threaded through a threaded bore in the cover 18 and has one end bearing against a thrust seat 34, through the interposed diaphragm 31. Ball bearings are interposed between the thrust seat and the top of the gear 21 and rest upon shims 35 located in a suitable recess in the segmental worm gear 21.

For supplying lubricant to the seating surfaces of the plug and casing and for jacking the plug from its seat a suitable fitting 40 (Figure 3) is provided having a suitable check valve therein and a screw for developing lubricant pressure. The lubricant is introduced into chamber 16 below the plug, wherein the main jacking force is concentrated, through this fitting. The seat 12 has connecting grooves 36 communicating with the chamber 16 and with two pairs of vertical lubricant grooves 37, 37' in the surface of the plug. The grooves 37 are disposed on the plug so that in the open or closed position thereof they communicate with the connecting grooves 36 at the bottom, and they communicate at the top of the plug in all positions with the ends of the circumferential groove 38 in the plug. The grooves 37' likewise communicate with the connecting grooves 36 in the open or closed position and with the ends of circumferential groove 38' at the top of the plug diametrically opposite groove 38. The ends of grooves 38 and 38' at the top of the plug do not meet. Preferably the vertical grooves 37 and 37' are attenuated so as to resist the flow of lubricant therethrough and produce a delay or lag in the lubricant pressure transmitted therethrough from the chamber 16. Additional sealing effect to prevent leakage past the top of the plug can be provided by the helical attenuated groove 39 which begins at one end of groove 38 and circumscribes the plug terminating at the top thereof whereby lubricant can find its way into chamber 17 from chamber 16. By reason of the attenuated form of the grooves 37, 37' and 39 the pressure of the lubricant above the plug lags behind that in chamber 16 so as not to interfere with the jacking of the plug when lubricant pressure is applied at chamber 16.

The cover 18 is inherently resilient and to secure sufficient strength and resiliency in the cover it is formed preferably as a steel forging or steel casting of suitable thickness. The adjustment screw 33 can be adjusted inwardly or outwardly by turning in the proper direction to develop the desired stresses in the spring cover 18 to resiliently hold the plug 13 in its seat against the action of line fluid or lubricant pressure. The adjustment screw 33 can be covered by a cap 34' threaded thereon which serves the purpose of concealing the screw 33 and locking it in adjusted position.

The vertical grooves 37 and 37' communicate with the grooves 36 in the casing only in the open or closed position of the valve, and in intermediate positions there is no communication between grooves 37, 37' and chamber 16. In order to prevent over-running of the plug upon turning, the worm gear 21 has projecting stop portions 41, 41' cooperating with the stop 42 on the interior of the casing in chamber 17 which limit rotation of the plug to an arc of about 90°. The worm 22 for turning the plug is secured to the shaft 26 by a key 43 or other suitable means and spacing collars 44 and 45 are secured thereon at either end of the worm to take up play in the worm shaft. The shaft 26 is journalled in a ball bearing 46 at one end 47 thereof operating in conjunction with thrust member 56 located in the bore 48 in the extended portion 49 of the casing 10 which forms a gear chamber, and at its other end is journalled in the similar bearing 51. The bearing member 46 comprises concentric race members 52 and 53 between which are located the balls 54. A threaded stem 55 extends from the thrust member 56 at one end of the bore 48 through a plate 56' and has a nut 57 thereon. By turning the nut onto the stem 55 the thrust member 56 is brought into abutment with the stop shoulder 58 and is held in this position. A thrust washer or gasket 59 can be placed between this shoulder and the bearing cap for taking up wear and preventing leakage therethrough. At the other end 61 of the shaft 26 the similar bearing member 51 consists of the races 62 and 63 located in the bore 48 and between which are located the balls 64.

A bonnet member 65, which also acts as an operating stem bearing, is located at one end of the bore 48 and is secured to the casing extension 49 by studs 66 or other means. The end 61 of the worm shaft has a groove or kerf 67 therein which cooperates with a similar shaped rectangular tongue 68 at the inner end of operating shaft 27, the latter being journalled in the bonnet 65. An extended sleeve or hub 69 on the bonnet 65 cooperates with the bearing 51 to hold it against outward movement, and the bonnet may be provided with a shoulder 71 cooperating with a gasket on the internal step 72 of the casing extension 49 to provide a sealed connection therewith. It will be apparent that by reason of the tongue and groove coupling between the shafts 26 and 27 the shaft 26 can be rotated by turning the operating shaft 27 by means of the operating wheel 73 at the end thereof.

It will be observed that the bonnet 65 has a generally stepped tapered bore 74 therein and that the operating shaft 27 is similarly tapered. The shaft 27 preferably is lapped into the bore 74 which forms a seat therefor, and the shaft 27 is held in its seat by the action of the coil spring 75 located in a recess 76 at the end 61 of the shaft 26 pressing against the tongue 68 on the shaft 27. With this construction no packing is needed for the operating stem 27 as the lapped seat between the stem 27 and the bore 74 provide a perfect seal. The seat 74 may be stepped as indicated at 77 to reduce the area of contact between the shaft 27 and seat or bearing 74, and to provide chambers 80 for sealing plastic or lubricant. In order to reduce friction between the shaft 27 and its seat 74, and to release the shaft 27 for turning in case it becomes jammed into its tapered seat, lubrication and jacking means are provided comprising a suitable threaded bore 78 extending through the operating shaft having a check valve 79 therein, and a connecting bore 81 communicating with chamber 80. A screw 82 threaded into the bore 78 can develop the necessary pressure for feeding viscous plastic or lubricant thereto. If desired a second lubricating assembly can be provided comprising a bore 83 in the bonnet member having a check valve 84 therein and having a similar lubricant screw 82 threaded into the bore 83. Because of the taper of the stem 27, the longitudinal component of lubricant pressure in the chambers 80 jacks the stem inwardly to free it from its seat, while at the same time the lubricant forms a plastic seal to prevent leakage and lubricates the bearing.

The bonnet 65 has a hub portion 85 externally threaded as at 86 upon which is threaded a collar 87 having an arm 88 extending longitudinally outward through a recess in a spoke of the operating wheel 73. Rotation of operating wheel 73 to open or close the valve will rotate the arm 88 and collar 87 causing the arm 88 to advance or recede an amount corresponding to the extent of rotation of the plug 13, and suitable indicia may be provided thereon to indicate the full open, full closed or any intermediate position of the valve plug 13.

The operation of the valve will now be described. As shown in Figures 1 and 2 the valve is in closed position because the port 14 in the plug 13 is cut off from communication with the passage 11. The stop 41 on the segmental worm gear 21 is abutting the stop 42 on the casing thereby preventing clockwise rotation of the plug as seen in Figure 2, and the indicia on the arm 88 shows the valve in closed position. To open the valve the operative rotates the wheel 73 in a counterclockwise direction thereby rotating the operating stem 27, worm shaft 26, and segmental worm gear 21 in a counterclockwise direction to open the valve. If it is desired to fully open the valve the operating wheel is given a number of turns. At full open position the stop member 41' on the segmental worm wheel 21 abuts the stop 42 on the casing and the arm 88 has moved out and indicates to the operative that the valve is in open position. The worm and segmental worm gear provide a compact mechanical advantage to facilitate operation of the valve.

The operating handle 73 may be difficult or impossible to turn manually due to the valve plug 13 being corroded into its seat or wedged therein, or the operating stem 27 being stuck in its bearing. The plug 13 can be released from its seat by turning the lubricant screw in the fitting 40 (Figure 3) to generate lubricant pressure in chamber 16 which jacks the plug from its seat. The upward movement of the plug is l'mited by proper adjustment of the screw 33 and reaction of resilient cover 18 to permit a film of lubricant to enter between the plug and its seat. At the same time lubricant is forced up through the connecting channels 36 and attentuated grooves 37, 37' to the circumferential grooves 38, 38' and spreads over the seat and through the attenuated groove 39 to the top of the plug. In this way the plug seat 12 becomes covered with a film of lubricant that spreads from the aforementioned grooves over the seating surfaces and the ports in the valve plug and casing are surrounded by a lubricant seal in the grooves and bottom chamber 16, as lubricant also finds its way upward along the seat 12 from the chamber 16 when the plug is jacked.

By turning the lubricant screws 82 lubricant under pressure is introduced into the chamber 80, and as the stem 27 is tapered the longitudinal component of the pressure will move the stem 27 longitudinally to free it from the seat 74 and at the same time a seal of viscous lubricant is spread over the faces of the stem 27 and seat 74. This lubricant seal enables easy turning of the stem 27 and because of its high viscosity it will remain in place for a long time and prevent leakage therethrough. The gearing in chamber 17 is lubricated by the lubricant which finds its way in through channel 39 and between the stem 27 and its seat or separate lubricant means therefor can be provided.

Figure 4:
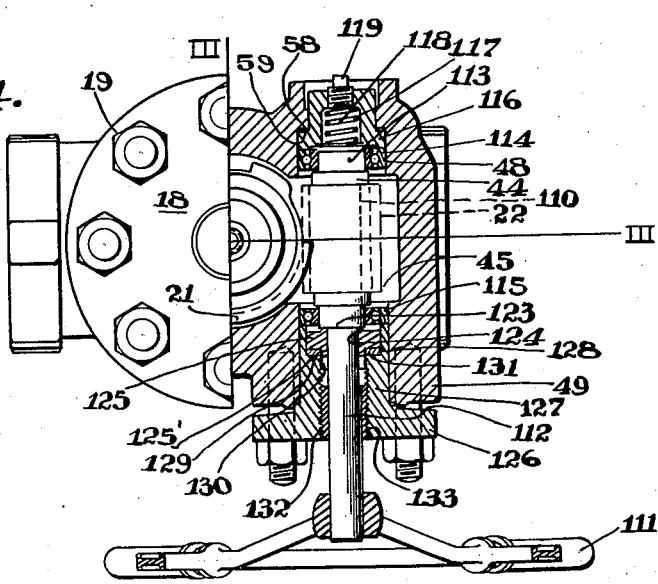
Figure 4 is a section taken on line IV—IV of Figure 3.

In the modification shown in Figures 3 and 4 wherein like reference characters denote like parts, the plug 13 has a similar gear segment 21 at one end keyed thereto and which is operated by a worm 22 secured to a shaft 110 which extends through the casing and has an operating wheel 111 at its end secured to a reduced portion 112 thereof. The shaft 110 is journalled at one end 113 in a ball bearing assembly 114 located in a suitable bore 48 in the casing extension 49, and is journalled adjacent the reduced end in a sim'lar ball bearing assembly 115. A bearing cap 116 is located in the bore 48 at the end 113 of the shaft and has a bore 117 therein in which is located a coil spring 118 which abuts the end 113 of the shaft 110 and the end wall of bore 117. By removing the tapered threaded plug 119 lubricant can be inserted through the opening into the gear chamber in any suitable manner.

The reduced portion 112 of the shaft 110 provides a shoulder 123 thereon which abuts the annular surface 124 of the metal packing washer 125, and the spring 118 constantly urges these surfaces into engagement. A bonnet member 126 bolted or otherwise secured to the casing extension 49 has a sleeve portion 127 which fits into bore 48. The packing member 125 is located in a bore 128 at the inner end of the bonnet sleeve, and a reduced bore 130 is provided in the bonnet into which the hub 129 of packing member 125 extends. If desired suitable resilient packing washers or gaskets 131 can be inserted between the metal packing member 125 and the shoulder 125' formed on bonnet 126 between the bores 128 and 130. An indicator sleeve 132 is loosely threaded into a threaded counterbore 133 of the bonnet member and is slidably keyed to the shaft 112 so that rotation of the shaft 112 causes the indicator sleeve 132 to telescope into or out of the threaded counterbore to indicate whether the valve is in open or closed position.

As in the modification shown in Figures 3 and 4 the valve plug 13 is rotated in its seat to open or closed position by operation of the hand wheel 111 and operating shaft 112, the operating shaft in this instance being integral with the worm shaft. Sealing of the operating stem 112 against leakage is provided at one end by the shoulder 123 abutting the annular surface 124 on the metal packing or washer 125. This joint may be ground if desired, and is surrounded by viscous lubricant which is supplied to the operating gearing and associated parts through the attenuated lubricant groove 39 in the plug in communication with groove 38. However, if desired, lubricant can be introduced into the gear chamber by a fitting in the stem similar to fitting 78. The lubricant likewise provides a seal between shoulders 58 and 59 of the bearing cap 116, thereby eliminating need for any packing for the valve operating stem or valve stem.

The valve plug in Figures 1 to 5 has a conduit 135 bored therethrough communicating with the port 14 at one end and at its other end extending through square stub 28. The gear 21 has a bore 136 therethrough which communicates with the gearing chamber. A one way check valve 137 located in the conduit 135 will open in one direction to permit lubricant to escape into port 14 should the pressure in the gear chamber become too great, but will not permit line fluid to enter the gear chamber.

The modification shown in Figure 5 shows still another arrangement embodying an operating stem 150 which is operatively coupled to the worm shaft 26 through a tongue and groove connection 66, 67. The bonnet member 153 has a bore 154 therein in which is located the operating shaft sleeve 155 having a flange or shoulder 156 at the inner end thereof to provide a flat annular seat 157. The operating shaft 150 is journalled in and extends through sleeve 155 and the enlarged portion 152 provides a shoulder 158 cooperating with annular face or seat 157 to provide a seal. A gasket 159 is inserted between the flange 156 and the internal shoulder 161 of the bonnet member. The outer end of sleeve 155 is threaded to receive the indicator member 87. A recess 162 is provided in the sleeve 155 to receive lubricant which may be introduced through a fitting 163 in the bonnet member.

In this modification the worm gear shaft is mounted on the combined end and radial thrust bearings 46 and 51 and floats between the springs 75 and 118. The reaction of the springs maintains the shoulders 157 and 158 pressed together to provide a sealed joint at low lubricant pressures in the gear chamber. When lubricant under pressure or line fluid is introduced into the gear chamber the fluid pressure firmly presses the shoulders 157 and 158 together and likewise acts as a plastic seal to prevent escape of fluid therebetween. Further sealing and lubrication of the operating stem 150 is provided by the circumferential groove 162 and lubricating fitting 163. If desired a separate lubrication fitting can be provided for the gearing chamber.

In addition to the advantages so far pointed out it will be seen that the constructions described provide a simple and compact assembly of working parts that can be removed readily and are easily accessible for replacement or repair. In each modification the bonnet member can be removed bringing with it the operating shaft unit which thus releases the worm shaft assembly which likewise can be removed as a unit. This can be accomplished without disturbing the valve plug or its seating adjustment.

The modification shown in Figures 6 to 11 illustrates the application of the invention to the smaller sizes of valves and embodies the additional principle of automatic plug jacking. In this modification the casing 210 has a passage 211 therethrough for line fluid, and a transverse bore 212 therein provides a seat for the rotatable tapered plug 213 having the hole or port 212' therethrough. The transverse bore 212 is covered at the larger end of the plug by a cover member 218 made of inherently resilient material such as die forged or cast steel, and a sealing diaphragm 219 is clamped between the cover and an internal shoulder on the casing. A ball bearing 220 is located in a suitable notch or depression in the large end of plug 213, and a thrust seat member 221 is adapted to cooperate therewith. A threaded plug 222 is located in the threaded bore 223 in the cover 218.

From the construction so far described it will be seen that by turning the threaded adjustment plug 222 it is advanced inward against the diaphragm 219 and exerts a thrust upon the ball 220 through the thrust transmitting member 221 to force the valve plug 213 into its seat. As the cover 218 is resilient it permits the plug to be jacked from its seat by lubricant pressure without disturbing the adjustment of the threaded plug 222. The force tending to hold plug 213 on its seat can be regulated by adjusting the threaded plug 222 inward to increase the pressure of cover 218 or by adjusting the threaded plug 222 outward to decrease the pressure of cover 218. In operation, the threaded adjusting plug 222 is set to hold the plug 213 in its seat against line pressure and upon jacking the plug by lubricant pressure enough clearance is provided to permit the spreading of a film of viscous lubricant over its seat.

The lubricating system for the plug 213 comprises a lubricant chamber 224 formed by the casing and the smaller end of the plug into which viscous lubricant can be introduced under pressure through a suitable fitting 241. Four short grooves 225 are located in the casing seat in communication with the chamber 224 and are disposed about 90° apart equidistant from the passage 211 through the casing. The plug 213 has four longitudinal grooves 226 in the surface thereof which communicate in pairs at the large end of the plug with the two inclined circumferential grooves 227. By introducing lubricant under pressure into chamber 224 in the position of the plug 213 as shown in Figure 6, the plug is jacked slightly from its seat against the resilient resistance of cover 218, and at the same time viscous lubricant is introduced into grooves 226 and 227 and distributed or smeared over the face of seat 212. In the open position of the plug the grooves do not form a closed circuit surrounding the ports, but in the closed position the ports are surrounded by the grooves 226 and 227.

The casing 210 is provided at the small end of tapered seat 212 with an extended portion 231 in which is located a tapered bore or bearing 232. A similarly tapered operating member 233 is journalled in this tapered bearing and has a splined portion 234 at its outer end to receive an adapter 235 keyed thereto or suitable wrench for operating the same. At its inner end the operating stem 233 is provided with a generally rectangularly shaped stub or tongue 236 which may be rounded at its ends and which fits into groove 237 in the small end of plug 213. The groove 237 may be described as butterfly shaped in cross section. A spring 238 in a suitable recess 239 in the inner end of operating stem 233 presses against the plug 213, and maintains the stem 233 seated in tapered bearing 232.

By introducing lubricant under pressure into chamber 224 by means of fitting 241 the plug 213 will be jacked from its seat, but under certain circumstances the internal pressure may wedge operating shaft 233 into its seat 232 so tightly as to prevent turning thereof for operating the valve plug. To obviate this difficulty means is provided for jacking the operating member 233 from its seat to permit rotation thereof. The stem 233 has a threaded bore 242 therein for receiving lubricant in stick form, which can be placed under pressure by lubricant screw 243. Adjacent the end of bore 242 are lateral ducts 244 communicating therewith and opening into the enlarged circumferential groove 245 or chamber which may lie wholly in the stem or bearing or partly in both as shown and may be described as lying in the plane of the bearing. By introducing lubricant under pressure into this groove the vertical component of the pressure acting on the inclined faces of the stem and bearing jacks the stem from its seat to permit turning thereof. At the same time the bearing face 232 is covered or smeared with a film of viscous lubricant. It will be understood that the groove 245 may be of any desired shape.

The operating stem has at its lower end two spaced vertical grooves 246 and 247 located in its surfaces and which are in communication with the groove or jacking chamber 245. The bearing surface 232 also has two oppositely disposed grooves 248 and 249 therein which are shown more clearly in Figures 6 and 8 out of communication with grooves 246 and 247 in the position shown. A circumferential groove 250 communicates at one end with groove 248, the other end terminating short of communication with groove 246 as shown. After the stem is jacked from its seat with the valve in closed position, the stem can turn relative to the plug 213 until the side of stub 236 abuts against one wall of butterfly groove 237. This turning motion is sufficient to bring the groove 247 into communication with groove 248 through circumferential groove 250 when the stem is rotated counterclockwise, as viewed in Figure 6, to open the valve so that the lubricant pressure generated by screw 243 is conducted through grooves 247 and 248 into lubricant chamber 224 to jack the plug from its seat. Upon continued rotation of stem 233 in counterclockwise direction the groove 247 maintains communication with groove 248 until the end thereof is passed so that during this phase of the stem operation both the stem and plug can be jacked simultaneously from their respective seats. This also can be accomplished while groove 246 is in communication with groove 249. In turning the stem counterclockwise the groove 247 cooperates with groove 248 to enable such jacking action. The compression of lubricant in chamber 237 by rotation of stub 236 therein likewise may be employed for jacking the plug from its seat.

The rotation of stem 233 is limited to about 120° by stop 251 which projects from the lower end of adapter 235 and cooperates with stops 252 and 253 integral with the casing extension 231. However, while stem 233 can rotate 120° plug 213 can rotate only 90°, as the cooperating stub 236 and groove 237 permit approximately 30° play between the operating stem and plug. This is sufficient to permit initial jacking of and rotation of the stem before the plug member is turned. Also, it is possible when the valve is in fully closed or opened positions to turn the stem 150° to 30° and thus bring the grooves of the stem into communication with the grooves in the casing, and then the stem can be returned to initial position to cut off communication with the chamber 224 and grooves 226 and 227. This arrangement also permits the development of lubricant pressure in chamber 224, when groove 246 is in communication with groove 250, to force the tapered stem into its tapered seat to prevent leakage. Although the check valve in bore 242 may be eliminated if so desired, I prefer to use this check valve as an added precaution against leakage.

A different arrangement of sealing grooves in the plug can be employed to produce a substantial sealing effect about the port. The invention may be embodied in other specific forms without departing from the spirit or essential characteristics thereof. The present embodiment is therefore to be considered in all respects as illustrative and not descriptive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In combination with a plug valve adapted for use under relatively high pressures and having a plug, a casing, a bearing surface in said casing tapering toward the exterior thereof, a tapered operating stem in said bearing separate from the plug and capable of longitudinal movement in said casing, an operative connection between said stem and plug, a chamber in said casing between said stem and the plug adapted to receive lubricant under pressure, a lubricant groove in the plane of said bearing and means to apply lubricant to said groove to seal, lubricate and move said stem against the pressure of lubricant in said chamber to release it for turning.

2. In a plug valve, a casing having a passageway therethrough and a seat formed transversely of the passageway, a valve plug rotatably disposed on said seat, resilient means for holding said plug on its seat, a sealing surface, a longitudinally movable operating stem separate from said plug and having a portion of its surface cooperating with said sealing surface to provide a seal therefor, means to move said stem longitudinally by lubricant pressure for initial turning thereof, and means operable after initial turning of said stem to move the plug longitudinally by lubricant pressure.

3. In a plug valve, a casing having a passageway therethrough and a seat formed transversely of the passageway, a valve plug rotatably disposed on said seat, resilient means for holding said plug on its seat, a sealing surface, a longitudinally movable operating stem separate from said plug and having a portion of its surface cooperating with said sealing surface to provide a seal therefor, means for introducing lubricant under pressure for moving said stem longitudinally, and means connecting said lubricating means with the plug after initial turning of the operating member to permit jacking said plug by lubricant, said stem and plug having a lost motion connection to permit initial rotation of the stem before operating the plug.

4. In a plug valve, a casing having a passageway therethrough and a seat formed transversely of the passageway, a valve plug rotatably disposed on said seat, resilient means for holding said plug on its seat, a tapered sealing surface associated with said casing, a longitudinally movable tapered operating stem separate from said plug and cooperating with said tapered sealing surface to provide a seal therefor, means for introducing lubricant under pressure for moving said stem longitudinally, separate means for introducing lubricant to the plug for jacking the plug from its seat, and means operable upon initial rotation of said stem to connect said first means with the plug for jacking the plug from its seat.

5. In a plug valve, a casing having a passageway therethrough and a seat formed transversely of the passageway, a valve plug rotatably disposed on said seat, a tapered sealing surface in said casing, a lubricant groove in said surface, a longitudinally movable operating stem separate from said plug and having a tapered portion cooperating with said sealing surface to prevent outward movement of said stem, an operative connection between said plug and stem, resilient means including a body of lubricant under pressure for holding said cooperating stem portion and sealing surface together, and means for applying lubricant under pressure to separate said surface and said tapered portion and provide a seal therebetween.

6. In a plug valve, a casing having a passageway therethrough for flow of fluid and a seat formed transversely of the passageway, a valve plug rotatably disposed on said seat, a sealing surface associated with the casing, an operating stem having a lubricant reservoir therein and a sealing surface bearing against the sealing surface of the casing, grooves in the plane of said sealing surfaces arranged to be connected with the reservoir in certain positions of the stem, and be disconnected in other positions of the stem, there being lubricant grooves in the seating surface of the plug and casing adapted to establish communication with the grooves in the sealing surface.

7. In a plug valve, a casing having a passageway therethrough for flow of fluid and a seat formed transversely of the passageway, a valve plug rotatably disposed in said seat, a tapered sealing surface associated with the casing, an operating stem having a tapered sealing surface bearing against the tapered surface of the casing, there being grooves in the said sealing surfaces, a lubricant reservoir in the stem communicating with the grooves in the tapered sealing surfaces in certain positions, and out of communication with said grooves in other positions, there being lubricant grooves in the seating surface of the plug and casing adapted to establish communication with the grooves in the tapered surface.

8. In a plug valve, a casing having a passageway therethrough for flow of fluid and a seat formed transversely of the passageway, a valve plug rotatably disposed in said seat, a tapered sealing surface associated with the casing and having channels opening therein, an operating stem having a lubricant reservoir therein and a cooperating tapered sealing surface and channels opening therein in constant communication with said reservoir, the channels in the stem surface communicating with the channels in the seat surface in certain positions and out of communication therewith in other positions, there being lubricant grooves in the seating surface of the plug and casing adapted to be in communication with the casing surface channels in certain positions of the plug.

9. In a plug valve, a casing having a passageway therethrough for flow of fluid and a seat formed transversely of the passageway, a valve plug rotatably disposed in said seat, a tapered seating surface associated with the casing and having open lubricant channels therein disposed substantially diametrically opposite, one of said channels having a circumferential branch covering an arc of less than 90°, an operating stem having a lubricant reservoir therein and a cooperating sealing surface with open channels therein disposed substantially 120° apart, whereby in certain positions of the stem the grooves therein communicate with the grooves in the surface, and are out of communication therewith in other positions of the stem, there being lubricant grooves in the seating surface of the plug and casing adapted to establish communication with the grooves in the tapered surface.

10. In a plug valve, a casing having a passageway therethrough for flow of fluid and a seat formed transversely of the passageway, a valve plug rotatably disposed in said seat, said casing forming a lubricant chamber with the end of the plug, a tapered sealing surface associated with the casing and having grooves therein communicating with said lubricant chamber, a tapered operating stem having a lubricant reservoir therein and a cooperating sealing surface with grooves therein in constant communication with said reservoir, the grooves in the stem surface communicating in certain positions with the grooves in the casing surface and being out of communication therewith in other positions, there being lubricant grooves in the seating surface of the plug and casing adapted to communicate with the lubricant chamber when the grooves of the stem and casing are in communication.

11. In a plug valve, a casing having a passageway therethrough for flow of fluid and a seat formed transversely of the passageway, a valve plug rotatably disposed in said seat, a tapered sealing surface associated with the casing and having grooves therein through an arc of substantially less than 50°, a tapered operating stem having a lubricant reservoir therein and grooves in the tapered surface substantially 120° apart, there being a lost motion connection between the stem and plug whereby the grooves in the stem surface may be moved into or out of communication with the grooves in the tapered surface without rotation of the plug.

12. In a plug valve, a casing having a passageway therethrough for flow of fluid and a seat formed transversely of the passageway, a valve plug rotatably disposed in said seat, a tapered sealing surface associated with the casing, an operating stem extending into a chamber in the casing, a tapered sealing surface on the stem bearing against the tapered surface of the casing, a lubricant reservoir in the stem communicating with the chamber in certain positions and out of communication with said chamber in other positions, and means for developing pressure in the lubricant reservoir whereby lubricant pressure against the end of the operating stem forces the stem into its seat.

13. In a plug valve, a casing having a passageway therethrough for flow of fluid and a seat formed transversely of the passageway, a valve plug rotatably disposed in said seat, a tapered sealing surface associated with the casing and having channels opening therein, an operating stem extending into a chamber in the casing and having a lubricant reservoir therein, a cooperating tapered sealing surface and channels opening therein in constant communication with said reservoir, the channels in the stem surface communicating with the channels in the seat surface in certain positions, and out of communication therewith in other positions, and means for developing pressure in the lubricant reservoir whereby lubricant pressure against the end of the operating stem forces the stem into its seat by lubricant pressure in certain positions thereof.

14. In a plug valve, a casing having a passageway therethrough and a tapered seat formed transversely of the passageway, a tapered valve plug rotatably disposed on said seat, resilient means for holding said plug on said seat, a bearing in said casing providing a sealing surface, an operating stem in said bearing having a cooperating sealing surface and separate from the plug for rotating said plug, said stem having a lost motion connection with said plug, and means for introducing lubricant under pressure to said sealing surfaces to seal and release said operating stem, whereby the operating stem may be rotated to spread the lubricant over the bearing surface to provide a seal prior to rotating the plug.

15. In a plug valve, a casing having a passageway therethrough and a tapered seat formed transversely of the passageway, a tapered valve plug rotatably disposed on said seat, resilient means for holding said plug on said seat, a bearing in said casing adjacent one end and tapered outwardly, a tapered operating stem in said bearing for rotating said plug separate therefrom and having a lost motion connection with said plug, and means for introducing lubricant under pressure to said tapered bearing to seal and release said operating stem, whereby the operating stem may be rotated to spread the lubricant over the bearing surface to provide a seal prior to rotating the plug.

16. In a plug valve, a casing having a passageway therethrough for flow of fluid and a tapered seat formed transversely of the passageway, a tapered valve plug rotatably disposed on said seat and providing a lubricant chamber adjacent the small end thereof, resilient means for holding the plug on its seat, a tapered bore in the casing communicating with said chamber to provide a stem seat, a longitudinally movable operating stem having a tapered portion engaging said stem seat and extending into said chamber, an operative connection between said plug and stem, said bore tapering in the same direction as said tapered seat, there being a groove in the plane of the stem seating surface and means in said stem for applying lubricant under pressure to said groove and chamber.

17. In a plug valve, a casing having a passageway therethrough for flow of fluid and a tapered seat formed transversely of the passageway, a tapered valve plug rotatably disposed on said seat and providing a lubricant chamber adjacent one end thereof, said plug having grooves in its seating surface communicating with said chamber to provide a substantially complete lubricant seal around the passageway in closed position, resilient means for holding the plug on its seat, a tapered bore in the casing communicating with said chamber to provide a stem seat, a longitudinally movable operating stem having a tapered portion engaging said stem seat and extending into said chamber, an operative connection between said stem and plug, said bore tapering in the same direction as said tapered seat, there being a groove in the plane of the stem seating surface and means in said stem for applying lubricant under pressure to said latter groove and chamber.

18. In a plug valve, a casing having a passageway therethrough for flow of fluid and a tapered seat formed transversely of said passageway, a tapered valve plug rotatably disposed in said seat, a tapered sealing surface associated with said casing and terminating adjacent to the small end of said seat, said casing being formed to provide a lubricant chamber between said seat and said surface, a longitudinally movable operating stem having a tapered portion engaging said surface and a part extending into said chamber, a longitudinally slidable driving connection between said stem part and said plug, said seat and said surface tapering in the same direction, means for applying lubricant under pressure between said tapered stem portion and said sealing surface to lubricate, seal and jack said stem, and means to supply lubricant under pressure to said chamber.

19. In a plug valve, a casing having a passageway therethrough for flow of fluid and a tapered seat formed transversely of said passageway, a tapered valve plug rotatably disposed in said seat, a tapered sealing surface associated with said casing and terminating adjacent to the small end of said seat, said casing being formed to provide a lubricant chamber between said seat and said surface, lubricating grooves associated with said plug and seat and communicable with said chamber to seal and lubricate said plug, a longitudinally movable operating stem having a tapered portion engaging said surface and a part extending into said chamber, a longitudinally slidable driving connection between said stem part and said plug, said seat and said surface tapering in the same direction, means for applying lubricant under pressure between said tapered stem portion and said sealing surface to lubricate, seal and jack said stem, and means to supply lubricant under pressure to said chamber to lubricate, seal and jack said plug.

20. In combination with a tapered plug valve adapted for use under relatively high pressure and having a plug, a casing, a bearing surface in said casing tapering toward the exterior thereof, a tapered operating stem in said bearing separate from the plug and adjacent the small end thereof, said stem being capable of longitudinal movement in said casing and operatively connected to said plug, a lubricant groove in the plane of said bearing, and means to apply lubricant to said groove to seal, lubricate and move said stem to release it for turning.

21. In a plug valve, a casing having a passageway therethrough and a tapered seat formed transversely of the passageway, a tapered valve plug rotatably disposed on said seat, a sealing surface in said casing tapering towards the exterior thereof, a lubricant groove in said surface, a longitudinally movable operating stem separate from said plug and adjacent to the small end thereof, an operative connection between said plug and stem, said stem having a tapered portion cooperating with said sealing surface to prevent outward movement of said stem, resilient means including a body of lubricant under pressure for holding said cooperating stem portion and sealing surface together, and means for applying lubricant under pressure to separate said surface and said tapered portion and provide a seal therebetween.

SVEN J. NORDSTROM.